United States Patent
Cohen

(10) Patent No.: US 7,402,541 B2
(45) Date of Patent: Jul. 22, 2008

(54) SILICON NITRIDE COMPOSITIONS

(76) Inventor: Michael Cohen, Kibbutz Kfar Etzion, Mobile Post North Yehuda 90200 (IL)

( * ) Notice: Subject to any disclaimer, the term of this patent is extended or adjusted under 35 U.S.C. 154(b) by 108 days.

(21) Appl. No.: 11/378,886

(22) Filed: Mar. 16, 2006

(65) Prior Publication Data

US 2006/0276324 A1 Dec. 7, 2006

(30) Foreign Application Priority Data

Jun. 4, 2005 (IL) ..................................... 167894
Jan. 3, 2006 (IL) ..................................... 174022

(51) Int. Cl.
*C04B 35/584* (2006.01)
*F41H 5/02* (2006.01)
(52) U.S. Cl. ................. 501/97.2; 501/97.4; 89/36.02
(58) Field of Classification Search ............... 501/97.2, 501/97.4; 89/36.02; 2/2.5
See application file for complete search history.

(56) References Cited

U.S. PATENT DOCUMENTS

| 5,763,813 A | 6/1998 | Cohen et al. |
| 5,972,819 A | 10/1999 | Cohen |
| 6,112,635 A | 9/2000 | Cohen |
| 6,203,908 B1 | 3/2001 | Cohen |
| 6,289,781 B1 | 9/2001 | Cohen |
| 6,408,734 B1 | 6/2002 | Cohen |
| 6,575,075 B2 | 6/2003 | Cohen |
| 6,624,106 B2 * | 9/2003 | Cohen .................. 501/105 |
| 6,784,131 B2 * | 8/2004 | Komatsu et al. ........... 501/97.1 |
| 2006/0288855 A1 * | 12/2006 | Cohen ..................... 89/36.02 |

* cited by examiner

*Primary Examiner*—Karl E Group
(74) *Attorney, Agent, or Firm*—Billy A Robbins; Connolly Bove Lodge & Hutz

(57) ABSTRACT

The present invention provides silicon nitride with tungsten carbide additives in a sinterable material comprising silicon nitride and tungsten carbide, in which the silicon nitride content is a minimum of about 80% and wherein the total nitride component is about 28-40 w/w % $N_2$, and further comprising about 1.5-3.5 w/w % Al, about 2-6 w/w % Y, about 1.5-7 w/w % W, and about 3-9 w/w % $O_2$. which after sintering will produce ceramic bodies with a high degree of toughness suitable for armor applications.

3 Claims, No Drawings

SILICON NITRIDE COMPOSITIONS

The present invention relates to a silicon nitride material containing additives including tungsten (W). This composite sintered material is endowed with high strength and toughness. The present invention relates to a ceramic body employing the silicon nitride and W as a projectile impact resistor for use in an armor panel. Until now Silicon Nitride was not considered a material suitable to armor applications because of it's relatively low hardness. However because of the knowledge gained in preparing and testing ceramic bodies such as those described and claimed in US patents: U.S. Pat. Nos. 5,763,813; 6,112,635; 5,972,819; 6,203,908; 6,408,734; 6,289,781; and 6,575,075, the relevant teachings of which are incorporated herein by reference this material has now been found to be very suitable and even superior to other ceramic materials used for armor applications.

As stated, silicon nitride is known as a material having low hardness. This is especially apparent when contrasting this material with silicon carbide.

It has now been demonstrated in our earlier patents as referred to above, that cylinder technology is different from tile technology in that the tile technology has a tendency to spread the energy of impacts laterally. Cylinders, on the other hand, work according to mechanical structuring which has both a relative hardness comparable with alumina and very high toughness. This revolutionary discovery has now led to the further discovery of the present invention that silicon nitride, with a much higher toughness and hardness can be advantageously used in armor applications. This is especially true in the areas in which there is a "contact valley" formed by the intersection of two or more geometric bodies.

Valley contact. The projectile is jammed, usually between the flanks of three pellets, all of which participate in projectile arrest. The high side forces applied to the pellets are resisted by the pellets adjacent thereto as held by the substrate or plate, and penetration is prevented.

In contrast, in armor based on ceramic tiles, the weak point is in the intersections between two or more tiles.

Another advantage which has been found in the use of silicon nitride for armor is the fact that the geometric bodies can be formed by "cold pressing" and sintering. This allows for a significant cost reduction in the production process and at the same time allows for a much higher production capacity.

Ceramic materials are known as having various small limitations concerning homogeneity of the final sintered body. In order to improve homogeneity it has now been found that by adding W (tungsten Carbide in its oxidized form) it is possible to provide a ceramic body with improved toughness, which characteristic of improved toughness will enable the reduction of the overall height required to resist impact.

In view of the forgoing, an object of the present invention is to provide a silicon nitride that uses tungsten carbide in a composite sintered material which is endowed with high toughness and sufficient hardness for use in ballistic armor.

More particularly, an object of the present invention, therefore, is to provide a sintered product of silicon nitride exhibiting a high degree of toughness and relative high hardness, composed of alpha and beta silicon nitride together with at least one or more rare earth elements are selected from the group consisting of Y, Sc, La, Ce, Pr, Nd, Gdd, said sintered product exhibiting amazing characterizes of both toughness and hardness thereby making it most suitable for armor applications.

In a further aspect of the present invention, the inventor has studied the relationship between components of silicon nitride with tungsten carbide composite sintered material and the characteristics of the material, and has found that by regulating the amounts of rare earth elements, as reduced to certain corresponding oxides thereof, wherein said elements serve as sintering aid components, and by preferably also regulating the amount of excess oxygen as reduced to silicon dioxide in the composition, the sintered material exhibits a very high toughness and an acceptable hardness when fired in a temperature range of between 1600° C. and 1950° C.

Thus according to the present invention, there is now provided silicon nitride with tungsten carbide additives in a sinterable material comprising silicon nitride and tungsten carbide, in which the silicon nitride content is a minimum of about 80% and wherein the total nitride component is about 28-40 w/w % $N_2$, and further comprising about 1.5-3.5 w/w % Al, about 2-6 w/w % Y, about 1.5-7 w/w % W, and about 3-9 w/w % $O_2$. which after sintering will produce ceramic bodies with a high degree of toughness suitable for armor applications.

In an especially preferred embodiment of the present invention, there is provided a silicon nitride, tungsten carbide sinterable composition, in which the silicon nitride content is 84.5% alpha phase, and in which the total nitride component is about 34.8 w/w % $N_2$, said composition further comprising 6.7 w/w % $O_2$, 2.2 w/w % Al, 4.4 w/w % Y, and 2.5 w/w % W. which after sintering will produce ceramic bodies with a high degree of toughness suitable for armor applications.

In preferred embodiments of the present invention there is provided a shock-absorbing panel comprising a single internal layer of ceramic bodies which are directly bound and retained in plate form by a solidified materials such that the ceramic bodies are arranged in a single layer of adjacent rows and columns wherein a majority of each of said ceramic bodies is substantially in direct contact with at least four adjacent bodies, wherein said ceramic bodies are formed from the sinterable material as defined above.

Also provided according to the present invention is a sintered ceramic composition containing silicon nitride and tungsten carbide, produced from the sinterable composition as defined above and having a toughness of at least 4.5 KiC.

More specifically, the present invention is directed to a composite armor plate for absorbing and dissipating kinetic energy from high velocity, projectiles, said plate comprising a single internal layer of high density ceramic pellets which are directly bound and retained in plate form by a solidified material to provide mutual lateral support therebetween, characterized in that the pellets comprise silicon nitride sintered with tungsten carbide, the majority of the pellets each have at least one axis of at least 3 mm, and are bound by said solidified material in a single internal layer wherein a majority of each of said pellets is substantially in direct contact with at least 4 adjacent pellets, and said solidified material and said plate are elastic.

The term "elasticity" as used herein relates to the fact that the plates according to the present invention are bent when a load is applied thereto however upon release of said load the plate substantially returns to its original shape without damage.

While the cylindrical pellets of the present invention are defined as being substantially in contact with at least three adjacent pellets, it is known that a ceramic body which has been pressed, by it's nature, has an external surface area which is not smooth and has lack of consistency in its diameter along the main axis, and it is because of this that when casting the panel with the solidified material, the casting material(s) (resin, molten alumina, epoxy, and so on) seeps into spaces between the ceramic bodies (for instance, cylinders and spheres and so on), including the very small spaces found between the walls of two or more adjoining cylinders, forming a natural retaining substance in which the ceramic bodies are confined. Thus, even when the ceramic bodies are closely packed, the casting material will at least partially penetrate between them. This is due to the fact that during the pressing process, the ceramic material is compacted in the die and when the material is released from the die the material has a tendency to try and spring back to a less compact form. This generally occurs in the top part of the material so pressed, which is the first part of the body released from the die. Thus, in this case, there will be a small difference in the diameter of the body along the vertical axis. Secondly, it is well known that during the pressing process there are sometimes differences in densification of the powder in different areas of the ceramic body. When sintering the ceramic body, these small differences will cause the body to shrink in accordance with the different compressions found in various areas of the body, resulting in another reason for a small lack of homogeneity in the diameter along the vertical axis of the body. Thus there is rarely a situation in which one ceramic body is perfectly in direct contact with a second ceramic body in the panel, rather, the casting material will seep between the two bodies, at least partially encasing each of said bodies and the term substantially in contact is intended to also denote this possibility.

As will be realized, however, the sintered ceramic compositions containing silicon nitride and tungsten carbide, according to the present invention, can be shaped into any appropriate form and used in any armor context and configuration in which high toughness and hardness are sought.

Intergrain regions of the silicon nitride composite sintered material of the present invention may contain a crystalline phase in addition to an amorphous phase of, for example, rare earth elements, silicon, oxygen, or nitrogen. When a crystalline phase is present in the intergrain regions, softening of grain boundary glass at high temperatures is prevented, and mechanical characterizes of the sintered material at high temperatures can be enhanced, which is preferable.

Regarding the silicon nitride with tungsten carbide composition sintered material of the present invention, since sinterability of raw materials can be enhanced, an effective temperature range within which reliable characteristics are obtained can be widened, as compared with the case of conventional silicon nitride composite sintered material.

It is possible to reduce the W amount and to add $Al_2O_3$ instead to get similar results.

Conventionally, silicon nitride with tungsten carbide composite sintered material is used as a wear-resistant member such as bearing ball or as material for a heat resistant glow plug, or as a low temperature sintering material for optical applications, since the sintered material exhibits excellent wear, heat resistance, and electrical conductivity. A typical approach to attain such intended characteristics of the sintered material is to regulate the amount of tungsten carbide to be incorporated into the sintered material. However, the prior art does not teach or suggest the possibility of using such materials for armor applications.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

DESCRIPTION OF THE PREFERRED EMBODIMENTS

EXAMPLES

Different ceramic powder mixtures were used to prepare a series of ceramic bodies for testing as follows. The raw material powder mixture was wet-mixed in $H_2O$ for 40 hours by using grinding balls formed from silicon nitride, and then dried in a hot water bath. Thereafter, the resultant powder mixtures were pressed at a pressure of 15 tons and then sintered at a temperature of 1800° C. to form a plurality of identical ceramic cylindrical shaped pellets having the toughness and hardness required for armor application.

Example 1

A powder containing silicon nitride with tungsten carbide additives according to the present invention and characterized by 34% of $N_2$ was prepared and was composed of the following materials:

| Alpha Phase Silicon Nitride | $O_2$ | $H_2O$ (%) | Free Si (%) | Al (%) | Y (%) | W (%) | Fe (%) | Ca (%) | Mg (%) |
|---|---|---|---|---|---|---|---|---|---|
| 83.20% | 6.7 | 0.3 | 0.17 | 2.2 | 4.4 | 2.5 | 0.21 | 0.17 | <0.5 |

Lubricants were added to this mixture.

This mixture was then spray dried and granulated. The granules were introduced into a metal mold and were pressed under a pressure of 15 tons/cm² to prepare the molded article.

This article was then introduced into a kiln and was heated up to a firing sintering temperature of 1900° C.

Comparative Example A

A further series of silicon nitride ceramic pellets were formed as described in example 1, however without the addition of tungsten carbide. The components of said pellets were of the following proportions:

| Alpha Phase Silicon Nitride | $N_2$ | $O_2$ | $H_2O$ (%) | Free Si (%) | Fe (%) | Ca (%) | Mg (%) |
|---|---|---|---|---|---|---|---|
| 92.30% | 34.8 | 6.7 | 0.3 | 0.17 | 0.21 | 0.17 | <0.5 |

Comparative Example B

Alumina based ceramic pellets based on yttria stabilized zirconium-toughened alumina were prepared as described in example 1. The components of said pellets were of the following proportions:

| Al$_2$O$_3$ | ZrO$_2$ | Y$_2$O$_3$ | HfO$_2$ |
|---|---|---|---|
| 88.0 | 11 | 0.4 | 0.2 |

Pellets prepared according to example 1 and according to comparative examples A and B were allowed to cool and were then tested for ballistic suitability as indicated in the following table (crush test).

| | Crush test results in tons | | |
|---|---|---|---|
| Load | SN with W12.7Ø*12.7 | SiN No W12.7Ø*12.7 | ZTA 12.7Ø*12.7 |
| 1 | 13.4 | 6.2 | 7.55 |
| 2 | 13 | 4.7 | 5.07 |
| 3 | 11.1 | 4.2 | 5.98 |
| 4 | 13.9 | 3.8 | 4.92 |
| 5 | 15.3 | 5.9 | 6.54 |
| 6 | 12.4 | 6.1 | 7.50 |
| 7 | 12.6 | 5.8 | 7.20 |
| 8 | 15.3 | 6.7 | 7.81 |
| 9 | 16.3 | 6.5 | 8.92 |
| 10 | 14 | 4.9 | 7.25 |
| Average | 13.73 | 5.48 | 6.87 |
| Min | 11.1 | 3.8 | 4.92 |
| Max | 16.3 | 6.7 | 8.92 |
| Stdv | 1.57 | 1.0 | 1.25 |

As will be noted, the first column representing the testing of compositions of the present invention shows an average crush strength of over 13 tons while a silicon nitride based composition without tungsten incorporated therein shows an average crush strength of less than 6 tons.

Similarly the third column shows that prior art alumina based ceramic pellets based on yttria stabilized zirconium-toughened alumina, shows an average crush strength of less than 7.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A shock-absorbing panel comprising a single internal layer of ceramic bodies which are directly bound and retained in plate form by a solidified materials such that the ceramic bodies are arranged in a single layer of adjacent rows and columns wherein a majority of each of said ceramic bodies is substantially in direct contact with at least four adjacent bodies, wherein said ceramic bodies are formed from sintered material comprising silicon nitride and tungsten carbide, in which the silicon nitride content is a minimum of about 80% and wherein the total nitride component is about 28-40 w/w % N$_2$, and further comprising about 1.5-3.5 w/w % Al, about 2-6 w/w % Y, about 1.5-7 w/w % W, and about 3-9 w/w % O2, which after sintering will produce ceramic bodies with a high degree of toughness suitable for armor applications.

2. A shock-absorbing panel as defined in claim 1 wherein said sintered ceramic bodies have a toughness of at least 5.5 KiC.

3. A composite armor plate for absorbing and dissipating kinetic energy from high velocity, armor-piercing projectiles, said plate comprising a single internal layer of high density ceramic pellets which are directly bound and retained in plate form by a solidified material to provide mutual lateral support therebetween, characterized in that the pellets comprise silicon nitride sintered with tungsten carbide, in which the silicon nitride content is a minimum of about 80% and wherein the total nitride component is about 28-40 w/w % N2, and further comprising about 1.5-3.5 w/w % Al, about 2-6 w/w % Y, about 1.5-7 w/w % W, and about 3-9 w/w % O2, which after sintering will produce ceramic pellets with a high degree of toughness suitable for armor applications, the majority of the pellets each have at least one axis of at least 3 mm, and are bound by said solidified material in a single internal layer wherein a majority of each of said pellets is substantially in direct contact with at least 4 adjacent pellets, and said solidified materials and said plate are elastic.

* * * * *